(12) United States Patent
Kuriyama

(10) Patent No.: US 9,889,708 B2
(45) Date of Patent: Feb. 13, 2018

(54) PNEUMATIC TIRE

(71) Applicant: The Yokohama Rubber Co., LTD., Minato-ku, Tokyo (JP)

(72) Inventor: Masatoshi Kuriyama, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/039,801

(22) PCT Filed: Oct. 29, 2014

(86) PCT No.: PCT/JP2014/078769
§ 371 (c)(1),
(2) Date: May 26, 2016

(87) PCT Pub. No.: WO2015/079858
PCT Pub. Date: Jun. 4, 2015

(65) Prior Publication Data
US 2016/0375728 A1 Dec. 29, 2016

(30) Foreign Application Priority Data

Nov. 27, 2013 (JP) .................................. 2013-245332

(51) Int. Cl.
*B60C 11/03* (2006.01)
*B60C 11/12* (2006.01)
*B60C 11/01* (2006.01)

(52) U.S. Cl.
CPC .......... *B60C 11/0304* (2013.01); *B60C 11/01* (2013.01); *B60C 11/03* (2013.01);
(Continued)

(58) Field of Classification Search
CPC ......... B60C 11/0306; B60C 2011/0348; B60C 11/1236; B60C 2011/0381; B60C 2011/0383; B60C 11/04; B60C 11/12
See application file for complete search history.

(56) References Cited

U.S. PATENT DOCUMENTS 4,387,754 A * 6/1983 Mirtain ............... B60C 11/0306
152/209.1
4,807,679 A * 2/1989 Collette .............. B60C 11/0306
152/209.18
(Continued)

FOREIGN PATENT DOCUMENTS

GB 918988 A * 2/1963
JP 58-167207 A * 10/1983
(Continued)

OTHER PUBLICATIONS

Machine translation for Japan 63-159111 (no date).*
(Continued)

*Primary Examiner* — Steven D Maki
(74) *Attorney, Agent, or Firm* — Thorpe North & Western

(57) ABSTRACT

A pneumatic tire with five land parts formed by four circumferential main grooves wherein middle land parts each include a first sub groove and a second sub groove that are formed independently and arranged alternately in the tire circumferential direction on two sides of the middle land part in the tire width direction, the first sub groove being formed by the lug groove having one end thereof opening to one of the circumferential main grooves and the other end terminating in the middle land part, the second sub groove being formed by the lug groove having one end thereof opening to one of the circumferential main grooves and the other end terminating in the middle land part, and the middle land part further includes a concave part on a wall on an outer side of the middle land part in the tire width direction and spaced by each sub groove.

12 Claims, 3 Drawing Sheets

(52) U.S. Cl.
CPC .......... *B60C 11/0306* (2013.01); *B60C 11/12* (2013.01); *B60C 11/1236* (2013.01); *B60C 2011/0341* (2013.01); *B60C 2011/0348* (2013.01); *B60C 2011/0358* (2013.01); *B60C 2011/0381* (2013.01); *B60C 2011/0383* (2013.01); *B60C 2011/1209* (2013.01)

(56) References Cited

U.S. PATENT DOCUMENTS

| | | | | |
|---|---|---|---|---|
| 5,733,393 | A | * | 3/1998 | Hubbell .................. B60C 11/00 152/154.2 |
| 6,923,232 | B1 | * | 8/2005 | Welbes ............... B60C 11/0306 152/209.18 |
| 2010/0186861 | A1 | | 7/2010 | Ishiguro et al. |
| 2013/0167996 | A1 | * | 7/2013 | Oda ........................ B60C 11/04 152/209.18 |
| 2014/0290815 | A1 | * | 10/2014 | Tomida ............... B60C 11/1236 152/209.18 |

FOREIGN PATENT DOCUMENTS

| | | | |
|---|---|---|---|
| JP | S62-0299407 | | 12/1987 |
| JP | 63-159111 | A * | 7/1988 |
| JP | H06-055912 | | 3/1994 |
| JP | 2010-168006 | | 8/2010 |
| JP | 2011-042260 | | 3/2011 |
| JP | 2011-051408 | | 3/2011 |
| JP | 2012-140091 | | 1/2012 |
| JP | 2012-140091 | | 7/2012 |
| JP | 2013-039899 | | 2/2013 |

OTHER PUBLICATIONS

Machine translation for Japan 58-167207 (no date).*
International Search Report for International Application No. PCT/JP2014/078769 dated Jan. 20, 2015, 4 pages, Japan.

* cited by examiner

FIG. 2A

| | CONVENTIONAL EXAMPLE | WORKING EXAMPLE 1 | WORKING EXAMPLE 2 | WORKING EXAMPLE 3 | WORKING EXAMPLE 4 | WORKING EXAMPLE 5 | WORKING EXAMPLE 6 | WORKING EXAMPLE 7 | WORKING EXAMPLE 8 |
|---|---|---|---|---|---|---|---|---|---|
| MIDDLE LAND PART — FIRST SUB GROOVE | - | ○ | ○ | ○ | ○ | ○ | ○ | ○ | ○ |
| MIDDLE LAND PART — SECOND SUB GROOVE | - | ○ | ○ | ○ | ○ | ○ | ○ | ○ | ○ |
| SUB GROOVE TERMINATION POSITION IN TIRE CIRCUMFERENTIAL DIRECTION | - | - | ○ | - | - | - | - | - | - |
| SUB GROOVE INCLINATION (SAME DIRECTION AS CENTER LAND PART) | - | - | - | - | ○ | ○ | - | - | - |
| CENTER LAND PART — THIRD SUB GROOVE | - | - | - | ○ | ○ | ○ | - | - | - |
| CENTER LAND PART — FOURTH SUB GROOVE | - | - | - | ○ | ○ | ○ | - | - | - |
| SUB GROOVE INCLINATION (SAME DIRECTION AS MIDDLE LAND PART) | - | - | - | - | - | ○ | - | - | - |
| SHOULDER LAND PART — AUXILIARY GROOVE | - | - | - | - | - | - | ○ | - | ○ |
| SHOULDER LAND PART — FIFTH SUB GROOVE | - | - | - | - | - | - | - | ○ | ○ |
| SHOULDER LAND PART — SIXTH SUB GROOVE | - | - | - | - | - | - | ○ | ○ | ○ |
| SIPE DISTRIBUTION | - | - | - | - | - | - | - | - | ○ |
| PERFORMANCE ON SNOW | 100 | 102 | 102 | 103 | 103 | 103 | 104 | 102 | 104 |
| STEERING STABILITY PERFORMANCE ON DRY ROADS | 100 | 100 | 102 | 103 | 103 | 104 | 100 | 100 | 100 |
| PASSING NOISE RESISTANCE PERFORMANCE | 100 | 100 | 100 | 100 | 102 | 102 | 100 | 102 | 102 |

|  |  | WORKING EXAMPLE 9 | WORKING EXAMPLE 10 | WORKING EXAMPLE 11 | WORKING EXAMPLE 12 | WORKING EXAMPLE 13 | WORKING EXAMPLE 14 | WORKING EXAMPLE 15 | WORKING EXAMPLE 16 | WORKING EXAMPLE 17 |
|---|---|---|---|---|---|---|---|---|---|---|
| MIDDLE LAND PART | FIRST SUB GROOVE | ○ | ○ | ○ | ○ | ○ | ○ | ○ | ○ | ○ |
|  | SECOND SUB GROOVE | ○ | ○ | ○ | ○ | ○ | ○ | ○ | ○ | ○ |
|  | SUB GROOVE TERMINATION POSITION IN TIRE CIRCUMFERENTIAL DIRECTION | - | ○ | ○ | - | - | - | - | ○ | ○ |
|  | SUB GROOVE INCLINATION (SAME DIRECTION AS CENTER LAND PART) | - | - | - | - | - | - | ○ | ○ | ○ |
| CENTER LAND PART | THIRD SUB GROOVE | - | - | - | ○ | ○ | ○ | ○ | ○ | ○ |
|  | FOURTH SUB GROOVE | - | - | - | ○ | - | ○ | ○ | ○ | ○ |
|  | SUB GROOVE INCLINATION (SAME DIRECTION AS MIDDLE LAND PART) | - | - | - | ○ | ○ | ○ | ○ | ○ | ○ |
| SHOULDER LAND PART | AUXILIARY GROOVE | ○ | ○ | ○ | - | ○ | ○ | ○ | ○ | ○ |
|  | FIFTH SUB GROOVE | ○ | ○ | ○ | - | ○ | ○ | ○ | ○ | ○ |
|  | SIXTH SUB GROOVE | ○ | - | ○ | - | - | - | - | ○ | ○ |
|  | SIPE DISTRIBUTION | ○ | - | ○ | - | - | - | - | - | ○ |
| PERFORMANCE ON SNOW |  | 105 | 102 | 102 | 103 | 103 | 105 | 105 | 105 | 106 |
| STEERING STABILITY PERFORMANCE ON DRY ROADS |  | 100 | 102 | 104 | 103 | 103 | 103 | 104 | 105 | 105 |
| PASSING NOISE RESISTANCE PERFORMANCE |  | 102 | 102 | 102 | 100 | 102 | 102 | 102 | 102 | 102 |

FIG. 2B

PNEUMATIC TIRE

TECHNICAL FIELD

This technology relates to a pneumatic tire that achieves both performance on snow and steering stability performance on dry roads.

BACKGROUND ART

Conventionally, for example, a pneumatic tire as described in Japanese Unexamined Patent Application Publication No. H6-55912A that aims to reduce tire noise, particularly patterned noise, and to provide excellent water drainage is known. This pneumatic tire includes a plurality of land parts in a tire tread that are continuous in a circumferential direction of the tread, being defined by a tread end and a plurality of main grooves extending along a circumference of the tread and arranged with spacing in a tread width direction. In this pneumatic tire, sipes in the tread extend from each tread end and pass obliquely through the main grooves toward a convergence at a central region of the tread, being arranged with substantially equal spacing in the circumferential direction of the tread. The sipes intermittently include groove-like enlarged portions with an enlarged opening width in a tread surface.

Also, for example, a pneumatic tire as described in Japanese Unexamined Patent Application Publication No. 2011-51408A that aims to improve snow performance without affecting braking performance on a dry road surface is known. In this pneumatic tire, a tread pattern is based on a plurality of blocks defined and formed by a plurality of circumferential grooves provided in a rotation direction of the tire and a plurality of lateral grooves provided in a width direction of the tire. Among the blocks, a block arranged on a shoulder side is provided with a lug groove that passes through a side wall of the block and has one end thereof opening to one of the circumferential grooves.

In addition, for example, a pneumatic tire as described in Japanese Unexamined Patent Application Publication No. 2013-39899A that aims to improve performance on snow while maintaining wet performance is known. In this pneumatic tire, a surface of a tread of the tire includes a plurality of circumferential grooves extending in a tread circumferential line and land parts defined by the circumferential grooves. In at least one of the land parts, a plurality of lateral grooves and lateral sipes are formed to extend from one of two circumferential grooves that define the one of the land parts to the other one, and to open to at least one of the circumferential grooves. On both sides of at least one of the land parts, a plurality of protrusions are formed so as to protrude from a bottom of the two circumferential grooves that define the land part to an outer side in a tire radial direction, and to be continuous with a side wall of the land part.

Furthermore, for example, a pneumatic tire as described in Japanese Unexamined Patent Application Publication No. 2010-168006A that aims to improve dry performance while maintaining snow performance at a conventional level is known. In this pneumatic tire, a tread surface has five land parts defined and formed by four main grooves extending in a tire circumferential direction. The five land parts include a center land part, two middle land parts on outer sides of the center land part in a tire width direction, and two shoulder land parts further outward in the tire width direction. The land parts include sub grooves and sipes. Total groove surface area ratios of the sub grooves and the sipes in the land parts vary among the center land part, the shoulder land parts, and the middle land parts such that the center land part and the shoulder land parts have a lower ratio and the middle land parts have a higher ratio.

In the pneumatic tires of Japanese Unexamined Patent Application Publication Nos. H6-55912A, 2011-51408A, 2013-39899A and 2010-168006A as described above, and mainly in Japanese Unexamined Patent Application Publication No. 2010-168006A, a tread surface has five land parts defined and formed by four main grooves extending in a tire circumferential direction. The five land parts include a center land part, two intermediate land parts on outer sides of the center land part in a tire width direction, and two shoulder land parts further outward in the tire width direction. Also, sub grooves and sipes are formed in each of the land parts. The sub grooves and the sipes have drainage characteristics for water and for snow, and provide an improvement to performance on snow (snow performance). However, the sub-grooves and the sipes cause a decrease in block rigidity, and tend to decrease steering stability performance on dry roads (dry performance).

In Japanese Unexamined Patent Application Publication No. 2010-168006A, for dry road surfaces, a groove surface area ratio is decreased in the center land part, which affects steering stability performance while driving straight, and in the shoulder land parts, which affect steering stability performance while cornering. This enhances the rigidity of the center land part and the shoulder land parts, and serves to improve the steering stability performance on dry road surfaces. However, the steering stability performance on dry roads is highly affected by the middle land parts. The rigidity of the middle land parts is decreased due to that the middle land parts are formed in a block shape, which makes improvements to the steering stability performance on dry roads remarkably difficult to obtain.

SUMMARY

The present technology has been made in consideration of the above, and provides a pneumatic tire that achieves both performance on snow and steering stability performance on dry roads.

A first pneumatic tire of the technology includes, on a tread surface of a tread part, five land parts extending in a tire circumferential direction, the five land parts being formed by four circumferential main grooves extending in the tire circumferential direction, the five land parts including a center land part arranged at the center in a tire width direction, middle land parts arranged on two outer sides of the center land part and neighboring the center land part in the tire width direction, and shoulder land parts arranged on outer sides of the middle land parts and neighboring the middle land parts in the tire width direction, the five land parts each include a lug groove and a sipe intersecting the tire circumferential direction. In such a pneumatic tire, the middle land part includes a first sub groove and a second sub groove that are formed independently and arranged alternately in the tire circumferential direction on two sides of the middle land part in the tire width direction, the first sub groove being formed by the lug groove having one end thereof opening to one of the circumferential main grooves and the other end terminating in the middle land part, the second sub groove being formed by the lug groove having one end thereof opening to one of the circumferential main grooves and the other end terminating in the middle land part and by the sipe having one end thereof opening to the other end of the lug groove and the other end terminating in the middle land part, and the middle land part further includes a concave part formed on a wall on an outer side of the middle land part in the tire width direction and spaced by each of the sub grooves.

According to this pneumatic tire, the lug groove and the sipe are formed in each of the land parts so as to intersect in the tire circumferential direction. This enables improvements to performance on snow by imparting drainage characteristics for water and for snow. Also, in the middle land part, the first sub groove and the second sub groove are formed independently. The first sub groove is formed by the lug groove such that one end of the lug groove opens to one of the circumferential main grooves and the other end terminates in the middle land part. The second sub groove is formed by the lug groove such that one end of the lug groove opens to one of the circumferential main grooves and the other end of the lug groove terminates in the middle land part, and by the sipe such that one end of the sipe opens to the termination of the lug groove and the other end of the sipe terminates in the middle land part. As such, the middle land parts are formed of ribs that are continuous in the tire circumferential direction, thus imparting high rigidity to the middle land part and enabling steering stability performance on dry roads. As a result, performance on snow and steering stability performance on dry roads are both achieved. Furthermore, the first sub groove and the second sub groove are alternately arranged in the tire circumferential direction, on both sides in the tire width direction. Thus, groove distribution is averaged, which enables improvements to performance on snow and to steering stability performance on dry roads. Further still, a concave part is formed on the wall on the outer side in the tire width direction, spaced by the sub grooves. Thus, groove surface area is secured for the circumferential main grooves on the outer side in the tire width direction, which makes it possible to enhance drainage characteristics for water and for snow and to improve performance on snow.

Also, in a second pneumatic tire of the technology, in the middle land part of the first pneumatic tire of the technology, the sub grooves arranged on an inner side in the tire width direction and on the outer side in the tire width direction are arranged with respective termination positions shifted from each other in the tire circumferential direction.

According to this pneumatic tire, the sub grooves arranged on the inner side in the tire width direction and on the outer side in the tire width direction have termination positions arranged shifted from each other in the tire circumferential direction. As such, the middle land part has larger dimensions in the tire width direction, which is continuous in the tire circumferential direction. Thus, this makes it possible to enhance rigidity of the middle land part and to improve steering stability performance on dry roads.

Also, in a third pneumatic tire of the technology, in the center land part of one of the first pneumatic tire and the second pneumatic tire of the technology, third sub grooves that are each formed by the lug groove having one end thereof opening to one of the circumferential main grooves and the other end terminating in the center land part are arranged such that respective ends of the third sub grooves face each other on the inner side in the tire width direction and on the outer side in the tire width direction, and fourth sub grooves that are each formed by the lug groove having one end thereof opening to one of the circumferential main grooves and the other end terminating in the center land part on each inner side in the tire width direction and on the outer side in the tire width direction and by the sipe connecting the terminations of the lug grooves are arranged alternately with the third sub grooves in tire circumferential direction.

According to this pneumatic tire, in the center land part, the third sub groove formed by the lug groove enhances the rigidity of the center land part and thus enables improvements to the steering stability performance on dry roads. Also, the fourth sub groove including the sipe enhances drainage characteristics for water and for snow and enables improvements to performance on snow. Furthermore, the third sub groove and the fourth sub groove are alternately arranged in the tire circumferential direction, which enables both performance on snow and steering stability performance on dry roads to be achieved.

In addition, in a fourth pneumatic tire of the technology according to the third pneumatic tire of the technology, the sub grooves in the middle land part and the sub grooves in the center land part are formed to be arranged facing each other in the tire width direction spaced by the circumferential main grooves and to be inclined in an identical direction with respect to the tire circumferential direction.

According to this pneumatic tire, noise produced in the circumferential main grooves between the center land part and the middle land parts is dispersed to the sub grooves in the center land part and the sub grooves in the middle land parts, thus reducing vehicle noise and improving passing noise resistance performance.

Further, in a fifth pneumatic tire of the technology according to any one of the first to fourth pneumatic tires of the technology, an auxiliary groove extending in the tire circumferential direction within a ground contact width is arranged in the shoulder land part.

According to this pneumatic tire, the auxiliary groove enhances drainage characteristics for water and for snow and enables improvements to the performance on snow.

Furthermore, in a sixth pneumatic tire of the technology, in the shoulder part of the fifth pneumatic tire of the technology, a fifth sub groove and a sixth sub groove are alternately arranged in the tire circumferential direction. The fifth sub groove includes the lug groove that is continuous with the auxiliary groove on an outer side of the auxiliary groove in the tire width direction. The sixth sub groove includes the lug groove that is not continuous with the auxiliary groove and terminates on the outer side of the auxiliary groove in the tire width direction.

According to this pneumatic tire, the sixth sub groove includes the lug groove that is not continuous with the auxiliary groove and terminates on the outer side of the auxiliary groove in the tire width direction. As such, this enhances the rigidity of the shoulder land part and enables improvements to steering stability performance on dry roads. Also, the termination of the lug groove decreases vehicle noise and enables improvements to the passing noise resistance performance. Furthermore, the fifth sub groove includes the lug groove that is continuous with the auxiliary groove. As such, this enables the drainage performance for water and for snow to be enhanced while maintaining performance on snow.

Further still, in a seventh pneumatic tire of the technology, in the shoulder land part of the fifth pneumatic tire and the sixth pneumatic tire of the technology, the sipe extends from an end of the lug groove of each of the sub grooves facing the auxiliary groove toward the inner side in the tire width direction, and opens to one of the circumferential main grooves.

According to this pneumatic tire, the sipe provided in each of the sub grooves passes through the auxiliary groove and opens to one of the circumferential main grooves. Thus, this enhances drainage characteristics for water and for snow, and enables improvements to performance on snow.

According to the pneumatic tire according to the technology, performance on snow and steering stability performance are both achieved.

BRIEF DESCRIPTION OF DRAWINGS

FIGS. 2A-2B include a table showing results of performance testing performed on the pneumatic tire according to the embodiment of the technology.

DETAILED DESCRIPTION

Figure 1:
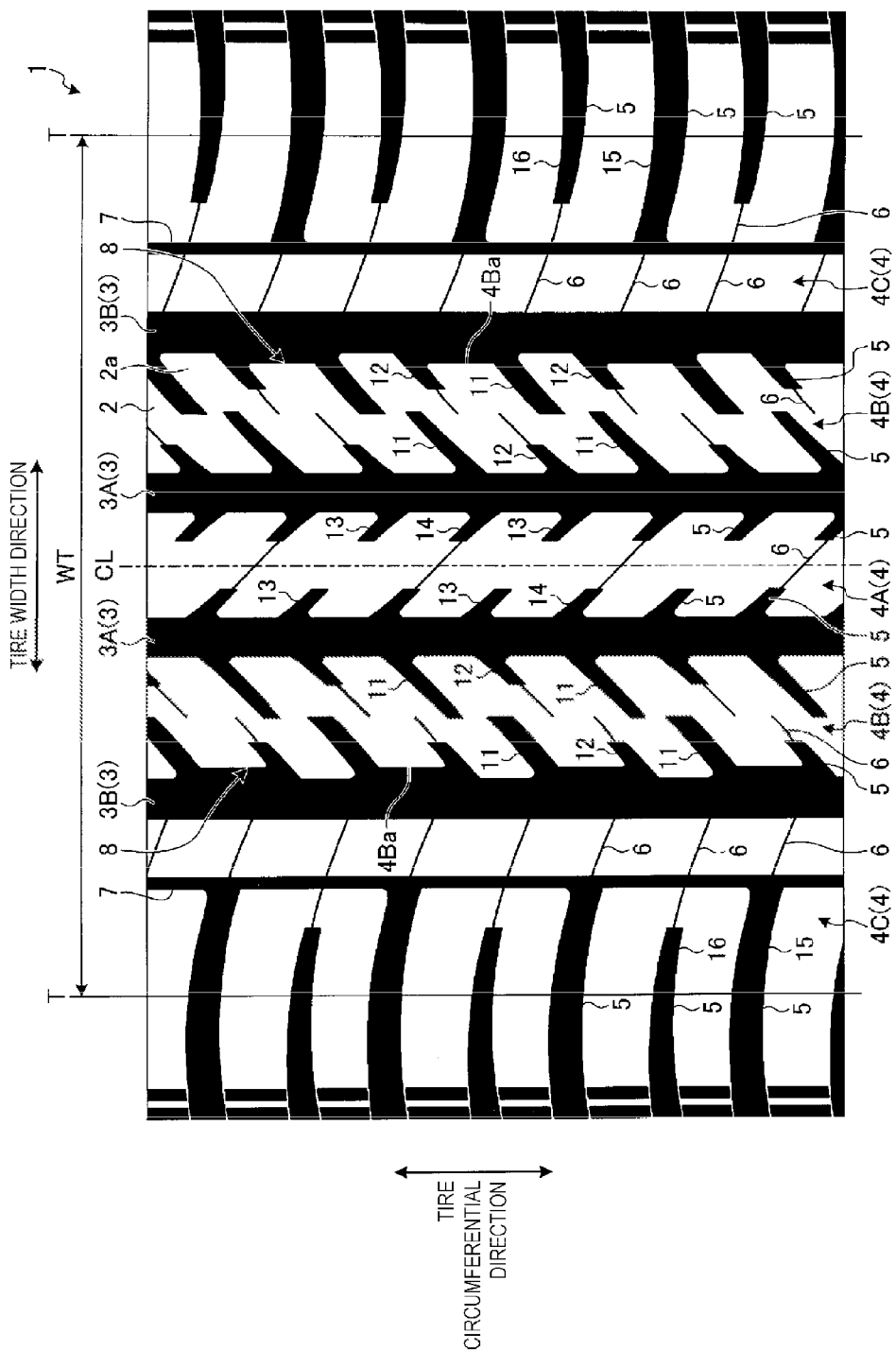
FIG. 1 is a plan view of a pneumatic tire according to an embodiment of the technology.

An embodiment of the technology is described in detail below, with reference to the drawings. No limitation to the technology is intended by the embodiment. Also, the components of the embodiment include components that are easily replaceable by those skilled in the art, or that are substantially identical to components of the embodiment. In addition, a plurality of modified examples described in the embodiment may be combined as desired within the scope of obviousness to those skilled in the art.

FIG. 1 is a plan view of a pneumatic tire according to the embodiment.

In the following description, "tire radial direction" refers to a direction orthogonal to a rotational axis (not illustrated) of a pneumatic tire 1. "Inner side in the tire radial direction" refers to a side approaching the rotational axis in the tire radial direction, and "outer side in the tire radial direction" refers to a side distanced from the rotational axis in the tire radial direction. Additionally, "tire width direction" refers to a direction parallel to the rotational axis. "Inner side in the tire width direction" refers to a side approaching a tire equatorial plane (tire equator) CL in the tire width direction, and "outer side in the tire width direction" refers to a side distanced from the tire equatorial plane CL in the tire width direction. Further, "tire circumferential direction" refers to a direction centered on the rotational axis. Furthermore, the tire equatorial plane CL is orthogonal to the rotational axis of the pneumatic tire 1, and is a plane passing through the center of the pneumatic tire 1 in terms of tire width. The tire equator is a line that is on the tire equatorial plane CL and extends in the circumferential direction of the pneumatic tire 1. In the embodiment, the tire equator and the tire equatorial plane share the reference sign CL.

The pneumatic tire 1 of the embodiment includes a tread portion 2, as illustrated in FIG. 1. The tread portion 2 is formed of a rubber material, and is exposed at an outermost side of the pneumatic tire 1 in the tire radial direction. The surface of the tread portion 2 is defined as a tread surface 2a that serves as a profile of the pneumatic tire 1.

The pneumatic tire 1 of the embodiment also includes a symmetrical tread pattern having symmetry (point symmetry with respect to points on the tire equator CL) on both sides of the tread portion 2 in the tire width direction, with the tire equatorial plane CL as a boundary. The tread portion 2 includes four circumferential main grooves 3 extending in the tire circumferential direction, being disposed in parallel in the tire width direction on the tread surface 2a. The tread portion 2 also includes five land parts 4, each formed by the four circumferential main grooves 3 into a rib shape extending in the tire circumferential direction on the tread surface 2a. The circumferential main grooves 3 each have a groove width of from 5 mm to 10 mm, both inclusive, and a groove depth of from 5 mm to 10 mm, both inclusive.

In addition, two of the circumferential main grooves 3 on the inner side in the tire width direction with the tire equatorial plane CL located therebetween serve as center main grooves 3A. Also, the other circumferential main grooves 3 on the outer side in the tire width direction of the center main grooves 3A each serve as a side main groove 3B. Furthermore, one of the land parts 4 on the tire equator CL between the center main grooves 3A serves as a center land part 4A. Also, the land parts 4 that are each located between the center main groove 3A and the side main groove 3B and neighbor the center land part 4A on the outer side in the tire width direction serve as middle land parts 4B. In addition, the land parts 4 on the outer side in the tire width direction of the side main grooves 3B and neighboring the middle land parts 4B on the outer side in the tire width direction serve as shoulder land parts 4C.

Also, the land parts 4 (4A, 4B, 4C) each have lug grooves 5 and sipes 6 formed therein intersecting the tire circumferential direction without following the tire circumferential direction. The lug grooves 5 each have a groove width of from 2 mm to 10 mm, both inclusive, and a groove depth that is shallower than the circumferential main grooves 3. In addition, the sipes 6 each have a groove width of from 0.4 mm to 1.5 mm, both inclusive, and a groove depth that is shallower than the circumferential main grooves 3. Also, the shoulder land parts 4C each have an auxiliary groove 7 extending in the tire circumferential direction within a ground contact width WT, which is on the inner side of ground contact edges T in the tire width direction. The auxiliary grooves 7 each have a groove width of from 0.5 mm to 2 mm, both inclusive, and a groove depth of from 3 mm to 6 mm, both inclusive.

Here, the ground contact edges T are defined as two outermost edges of a ground contact region in the tire width direction. In FIG. 1, the ground contact edges T are depicted as continuous in the tire circumferential direction. The ground contact region is a region where the tread surface 2a of the tread portion 2 of the pneumatic tire 1 comes into contact with the road surface, with the pneumatic tire assembled on a regular rim, inflated to a regular inner pressure, and loaded with 70% of a regular load. The ground contact width WT is defined as the length between the ground contact edges T in the tire width direction.

Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). The "regular inner pressure" refers to "maximum air pressure" defined by JATMA, a maximum value given in "tire load limits at various cold inflation pressures" defined by TRA, or "inflation pressures" defined by ETRTO. Note that the "regular load" refers to "maximum load capacity" defined by JATMA, a maximum value given in "tire load limits at various cold inflation pressures" defined by TRA, or "load capacity" defined by ETRTO.

In the middle land part 4B, the lug grooves 5 are each formed with one end opening to one of the center main groove 3A and the side main groove 3B, and with the other end terminating in the middle land part 4B. Also, in the middle land part 4B, the sipe 6 are each formed with one end opening to the other end of the lug groove 5 and continuing in the extension direction of the lug groove 5, and with the other end terminating in the middle land part 4B. A groove formed only by the lug groove 5 in the middle land part 4B is defined as a first sub groove 11. Also, a groove formed by the lug groove 5 and the sipe 6 in the middle land part 4B is defined as a second sub groove 12. The first sub groove 11 and the second sub groove 12 are each formed independently and are not interlinked. The first sub groove 11 and the second sub groove 12 are alternately arranged in the tire circumferential direction on the center main groove 3A side (inner side of the middle land part 4B in the tire width direction) and on the side main groove 3B side (outer side of the middle land part 4B in the tire width direction). Also, the first sub groove 11 and the second sub groove 12 may extend orthogonally to the tire circumferential direction. However, in this embodiment, the first sub groove 11 and the second sub groove 12 are formed with an identical inclination that is equal to or smaller than a right angle with respect to the tire circumferential direction. The inclination of the first sub groove 11 and the second sub groove 12 is preferably from 40° to 70°, both inclusive. Also, the first sub groove 11 and the second sub groove 12 are preferably formed so as to extend in parallel.

Furthermore, the first sub groove 11 and the second sub groove 12 on the center main groove 3A side (the inner side of the middle land part 4B in the tire width direction) and the first sub groove 11 and the second sub groove 12 on the side main groove 3B side (the outer side of the middle land part 4B in the tire width direction) are arranged shifted from each other in the tire circumferential direction, which prevents their termination positions from facing each other. That is, the termination positions of the first sub groove 11 and the second sub groove 12 do not face another first sub groove 11 and second sub groove 12 and face the circumferential main grooves 3 in the extension direction of the first sub groove 11 and the second sub groove 12.

As such, the middle land parts 4B where the first sub grooves 11 and the second sub grooves 12 are provided have concave parts 8 formed on walls 4Ba on the side main groove 3B sides (outer side in the tire width direction). The concave parts 8 are each located between the first sub groove 11 and the second sub groove 12 in the tire circumferential direction.

In the center land part 4A, the lug groove 5 is formed with one end opening to one of the center main grooves 3A on both sides of the center land part 4A, and with the other end terminating in the center land part 4A. Also, the sipe 6 is formed to be continuous with the other end of the lug groove 5 on the center main groove 3A sides (both sides in the tire width direction) of the center land part 4A. A groove formed only by the lug groove 5 in the center land part 4A is defined as a third sub groove 13. Also, a groove formed by the lug groove 5 and the sipe 6 is defined as a fourth sub groove 14. The third sub groove 13 and the fourth sub groove 14 are each formed independently and are not interlinked. The third sub groove 13 and the fourth sub groove 14 are alternately arranged in the tire circumferential direction on the center main groove 3A sides (both sides in the tire width direction). Also, the third sub groove 13 and the fourth sub groove 14 may extend orthogonally to the tire circumferential direction. However, in this embodiment, the third sub groove 13 and the fourth sub groove 14 is formed with an identical inclination that is equal to or smaller than a right angle with respect to the tire circumferential direction. The inclination of the third sub groove 13 and the fourth sub groove 14 is preferably from 70° to 90°, both inclusive. Also, the third sub groove 13 and the fourth sub groove 14 are preferably formed so as to extend in parallel.

Furthermore, the third sub grooves 13 on each side of the center main groove 3A (both sides in the tire width direction) have their termination positions facing each other. That is, the termination positions of the third sub grooves 13 face another third sub grooves 13 in the extension direction of the third sub grooves 13.

In addition, the sub grooves in the middle land parts 4B (the first sub grooves 11 and the second sub grooves 12) and the sub grooves in the center land part 4A (the third sub grooves 13 and the fourth sub grooves 14) are arranged to face each other in the tire width direction, with the center main grooves 3A of the circumferential main grooves 3 therebetween. That is, one end of each of the lug grooves 5 making up the first sub grooves 11 and the second sub grooves 12 and one end of each of the lug grooves 5 making up the third sub grooves 13 and the fourth sub grooves 14 are arranged to face each other in the tire width direction with the center main grooves 3A therebetween. Furthermore, the sub grooves in the middle land parts 4B (the first sub grooves 11 and the second sub grooves 12) and the sub grooves in the center land part 4A (the third sub grooves 13 and the fourth sub grooves 14) are formed with an identical inclination with respect to the tire circumferential direction.

In the shoulder land parts 4C, some of the lug grooves 5 are each formed to have one end thereof opening to the outer side of the ground contact edge T in the tire width direction, which is the outer side of the auxiliary groove 7 in the tire width direction, and to have the other end continuous with the auxiliary groove 7 beyond the ground contact edge T. Also, the other lug grooves 5 are each formed to have one end thereof opening to the outer side of the ground contact edge T in the tire width direction, which is the outer side of the auxiliary groove 7 in the tire width direction, and to have the other end terminating in the shoulder land part 4C beyond the ground contact edge T. In addition, in the shoulder land parts 4C, the sipes 6 are each formed to have one end thereof opening to the other end of the lug groove 5 and continuous in the extension direction of the lug groove 5, and to have the other end opening to the side main groove 3B. Also, a groove formed in the shoulder land part 4C, connecting the other end of the lug groove 5 to the auxiliary groove 7 is defined as a fifth sub groove 15. In addition, a groove formed in the shoulder land part 4C, extending from the other end of the lug groove 5 and terminating in the shoulder land part 4C is defined as a sixth sub groove 16. The fifth sub groove 15 and the sixth sub groove 16 are each formed independently and are not interlinked. The fifth sub groove 15 and the sixth sub groove 16 are alternately arranged in the tire circumferential direction. Additionally, the fifth sub groove 15 and the sixth sub groove 16 may extend orthogonally to the tire circumferential direction. However, in this embodiment, the fifth sub groove 15 and the sixth sub groove 16 are formed to curve in the tire circumferential direction. Also, the fifth sub groove 15 and the sixth sub groove 16 are preferably formed so as to extend in parallel.

The pneumatic tire 1 of the embodiment configured as described above includes the five land parts 4 extending in the tire circumferential direction on the tread surface 2a of the tread part 2, the five land parts 4 being formed by the four circumferential main grooves 3 extending in the tire circumferential direction. The land parts 4 include the center land part 4A arranged at the center in the tire width direction, the middle land parts 4B arranged on two outer sides of the center land part 4A so as to neighbor the center land part 4A in the tire width direction, and the shoulder land parts 4C arranged on outer sides of the middle land parts 4B so as to neighbor the middle land parts 4B in the tire width direction. Also, the lug groove 5 and the sipe 6 are formed in the land parts 4A, 4B, 4C so as to intersect the tire circumferential direction. In this pneumatic tire 1, the middle land part 4B includes the first sub grooves 11 and the second sub grooves 12 that are formed independently and alternately arranged in the tire circumferential direction on each side of the circumferential main grooves 3 (the center main groove 3A sides and the side main groove 3B sides). The first sub groove 11 is formed by the lug groove 5 such that one end of the lug groove 5 opens to the circumferential main groove 3 (one of the center main groove 3A and the side main groove 3B) and the other end of the lug groove 5 terminates in the middle land part 4B. The second sub groove 12 is provided by the lug groove 5 and the sipe 6 such that one end of the lug groove 5 opens to the circumferential main groove 3 (one of the center main groove 3A and the side main groove 3B) and the other end of the lug groove 5 terminates in the middle land part 4B, and such that one end of the sipe 6 opens to the termination of the lug groove 5 and the other end of the sipe 6 terminates in the middle land part 4B. In addition, a concave part 8 is formed on a wall 4Ba on each outer side in the tire width direction (the side main groove 3B side) and between the first sub groove 11 and the second sub groove 12 in the tire circumferential direction.

According to this pneumatic tire 1, the lug grooves 5 and the sipes 6 are formed in each of the land parts 4A, 4B, 4C so as to intersect in the tire circumferential direction. This enables improvements to performance on snow by imparting drainage characteristics for water and for snow. Also, in the middle land part 4B, the first sub groove 11 and the second sub groove 12 are formed independently. The first sub groove 11 is formed by the lug groove 5 such that one end of the lug groove 5 opens to the circumferential main groove 3 and the other end of the lug groove 5 terminates in the middle land part 4B. The second sub groove 12 is formed by the lug groove 5 and the sipe 6 such that one end of the lug groove 5 opens to the circumferential main groove 3 and the other end of the lug groove 5 terminates in the middle land part 4B, and such that one end of the sipe 6 opens to the termination of the lug groove 5 and the other end of the sipe 6 terminates in the middle land part 4B. As such, the middle land parts 4B are formed of ribs that are continuous in the tire circumferential direction, thus imparting the middle land parts 4B with high rigidity and satisfying steering stability performance on dry roads. As a result, performance on snow and steering stability performance on dry roads can be both achieved. Furthermore, the first sub grooves 11 and the second sub grooves 12 are alternately arranged in the tire circumferential direction, on both sides in the tire width direction. Thus, groove distribution is averaged, which enables improvements to performance on snow and to steering stability performance on dry roads. Further still, the concave part 8 is formed on the wall 4Ba on the outer side in the tire width direction (the side main groove 3B side), between the sub grooves 11, 12. Thus, groove surface area is secured for the circumferential main grooves 3 on the outer side in the tire width direction (the side main groove 3B side), which enables better drainage characteristics for water and for snow and improves performance on snow.

Also, in the pneumatic tire 1 of the embodiment, in the middle land parts 4B, the sub grooves 11, 12 arranged on the inner side in the tire width direction and on the outer side in the tire width direction are disposed with respective termination positions shifted from each other in the tire circumferential direction.

According to this pneumatic tire 1, the sub grooves 11, 12 arranged on the inner side in the tire width direction and the outer side in the tire width direction have termination positions arranged shifted from each other in the tire circumferential direction. As such, the middle land parts 4B each have larger dimensions in the tire width direction, being continuous in the tire circumferential direction. Thus, this makes it possible to enhance rigidity for the middle land parts 4B and to improve steering stability performance on dry roads.

In addition, in the pneumatic tire 1 of the embodiment, in the center land part 4A, the third sub grooves 13 are each formed by the lug groove 5 such that one end of the lug groove 5 opens to the circumferential main groove 3 (the center main groove 3A) and the other end of the lug groove 5 terminates in the center land part 4A. The third sub grooves 13 are arranged with their termination positions on the inner side in the tire width direction and termination positions on the outer side in the tire width direction facing each other. Also, the fourth sub grooves 14 are each formed by the lug groove 5 and the sipe 6 such that one end of the lug groove 5 opens to the circumferential main groove 3 (the center main groove 3A) on each inner side in the tire width direction and on the outer side in the tire width direction and the other end of the lug groove 5 terminates in the center land part 4A, and such that one of the sipe 6 is continuous with the termination of the lug groove 5. The fourth sub grooves 14 and the third sub grooves 13 are alternately arranged in the tire circumferential direction.

According to this pneumatic tire 1, in the center land part 4A, the third sub grooves 13 formed by the lug grooves 5 enhance the rigidity of the center land part 4A and thus enable improvements to the steering stability performance on dry roads. Also, the fourth sub grooves 14 including the sipes 6 improve drainage characteristics for water and for snow and improve performance on snow. Furthermore, the third sub grooves 13 and the fourth sub grooves 14 are alternately arranged in the tire circumferential direction, which enables both performance on snow and steering stability performance on dry roads to be achieved.

Additionally, in the pneumatic tire 1 of the embodiment, the sub grooves 11, 12 in the middle land parts 4B and the sub grooves 13, 14 in the center land part 4A are arranged so as to face each other in the tire width direction spaced by the circumferential main grooves 3 (the center main grooves 3A), and are preferably formed with an identical inclination with respect to the tire circumferential direction.

According to this pneumatic tire 1, noise produced in the circumferential main grooves 3 (the center main grooves 3A) between the center land part 4A and the middle land parts 4B is dispersed to the sub grooves 13, 14 in the center land part 4A and the sub grooves 11, 12 in the middle land parts 4B, thus reducing vehicle noise and improving passing noise resistance performance.

Further, in the pneumatic tire 1 of the embodiment, the shoulder land part 4C preferably has the auxiliary groove 7 extending in the tire circumferential direction within the ground contact width WT.

According to this pneumatic tire 1, the auxiliary groove 7 improves drainage characteristics for water and for snow and enables improvements to the performance on snow.

Furthermore, in the pneumatic tire 1 of the embodiment, in the shoulder parts 4C, the fifth sub grooves 15 and the sixth sub grooves 16 are preferably arranged in alternation in the tire circumferential direction. The fifth sub grooves 15 include the lug grooves 5 continuous with the auxiliary groove 7 on the outer side of the auxiliary groove 7 in the tire width direction. The sixth sub grooves 16 include the lug grooves 5 terminating on the outer side of the auxiliary groove 7 in the tire width direction and not continuous with the auxiliary groove 7.

According to this pneumatic tire 1, the sixth sub grooves 16 include the lug grooves 5 terminating on the outer side of the auxiliary groove 7 in the tire width direction and not continuous with the auxiliary groove 7. This enhances the rigidity of the shoulder land parts 4C and enables improvements to the steering stability performance on dry roads. Also, the terminations of the lug grooves 5 decreases vehicle noise and enables improvements to the passing noise resistance performance. Furthermore, the fifth sub grooves 15 include the lug grooves 5 continuous with the auxiliary groove 7. This enables the drainage characteristics for water and for snow to be improved while maintaining performance on snow.

Further still, in the pneumatic tire 1 of the embodiment, in the shoulder land parts 4C, it is preferable that the sipes 6 each extend from the termination of the lug groove 5 of each of the sub grooves 15, 16 facing the auxiliary groove 7 to the inner side in the tire width direction, and open to the circumferential main groove 3 (the side main groove 3B).

According to this pneumatic tire 1, the sipes 6 provided in the sub grooves 15, 16 pass through the auxiliary groove 7 and open to the circumferential main groove 3 (the side main groove 3B). This enhances drainage characteristics for water and for snow, and enables performance on snow to be improved.

EXAMPLES

In these working examples, performance testing concerning performance on snow, steering stability performance on dry roads, and passing noise resistance performance was performed on pneumatic tires of various types under different conditions (see FIGS. 2A-2B).

In this performance testing, a pneumatic tire having a tire size of 215/45R17 was assembled on a 17×7JJ rim, inflated to the regular inner pressure, and mounted on a test vehicle (1600 cc hybrid sedan).

The performance on snow was evaluated by measuring braking distance of the above-described test vehicle from a speed of 40 km/h on a snow-covered road surface. An indexed evaluation was then performed using a conventional example as a standard (100), based on measurement results. In this evaluation, a larger value indicates preferable performance.

The steering stability performance on dry roads was evaluated through a sensory evaluation performed by experienced drivers on items including straight-running stability during forward motion, as well as turning stability, rigidity, and steering during lane changing and cornering, at speeds of from 60 km/h to 120 km/h on dry road surfaces in the above-described test vehicle. An indexed evaluation was then performed using the conventional example as a standard (100) based on these sensory results. In this evaluation, a larger value indicates excellent steering stability performance.

The passing noise resistance performance was evaluated by measuring passing noise (out-of-vehicle noise) with the above-described test vehicle running at 53 km/h on a test course having an ISO road surface. An indexed evaluation was then performed using the measurement data (passing noise in dB) of the conventional example as a reference (100). In this evaluation, a larger value indicates less passing noise and thus represents excellent passing noise resistance performance.

In FIGS. 2A-2B, a pneumatic tire of the conventional example includes five land parts formed in the tire circumferential direction by four circumferential main grooves on a tread surface. The land parts include a center land part arranged at the center in the tire width direction, a middle land part arranged on each of two outer sides of the center land part and neighboring the center land part in the tire width direction, and a shoulder land part arranged neighboring the middle land part on the outer side of each of the middle land parts in the tire width direction. Also, a lug groove and a sipe are formed in each of the land parts so as to intersect the tire circumferential direction. That is, the conventional pneumatic tire is the pneumatic tire illustrated in FIG. 1 of Japanese Unexamined Patent Application Publication No. 2010-168006A.

Conversely, the pneumatic tire of each of Working Example 1 to Working Example 17 includes the first sub groove and the second sub grooves in the middle land parts. The pneumatic tire of each of Working Example 2, Working Example 5, Working Example 10, Working Example 11, Working Example 16, and Working Example 7 includes sub grooves arranged on the inner side and the outer side of the middle land parts in the tire width direction, with respective termination positions shifted from each other in the tire circumferential direction. In Working Example 3 to Working Example 5, and in Working Example 12 to Working Example 17, the center land part includes the third sub grooves and the fourth sub grooves. In Working Example 4, Working Example 5, and Working Example 15 to Working Example 17, the sub grooves of the middle land parts and the sub grooves of the center land part are arranged to face each other in the tire width direction with the circumferential main groove therebetween, and are each formed with an identical inclination with respect to the tire circumferential direction. The pneumatic tire of each of Working Example 6, Working Example 8, and Working Example 11 to Working Example 17 has the auxiliary grooves arranged to extend in the tire circumferential direction within the ground contact width of the shoulder land parts. In Working Example 7 to Working Example 11, and in Working Example 13 to Working Example 17, the shoulder land parts include the fifth sub grooves and the sixth sub grooves. In Working Example 8, Working Example 9, Working Example 11, and Working Example 14 to Working Example 17, the sipes in the shoulder land parts are provided so as to extend from an end of each of the sub grooves on the auxiliary groove side of the lug grooves and to open in the circumferential main grooves.

As shown by the testing results given in FIGS. 2A-2B, the pneumatic tire of each of Working Example 1 to Working Example 17 achieves both performance on snow and steering stability performance on dry road surfaces. In addition, the pneumatic tire of each of Working Example 4, Working Example 5, Working Example 7 to Working Example 11, and Working Example 13 to Working Example 17 clearly provides further improvements to passing noise resistance performance.

The invention claimed is:
1. A pneumatic tire, comprising
on a tread surface of a tread part, five land parts extending in a tire circumferential direction, the five land parts being formed by four circumferential main grooves extending in the tire circumferential direction, the five land parts including a center land part arranged at the center in a tire width direction, middle land parts arranged on two outer sides of the center land part and neighboring the center land part in the tire width direction, and shoulder land parts arranged on outer sides of the middle land parts and neighboring the middle land parts in the tire width direction, the five land parts each include a lug groove and a sipe intersecting the tire circumferential direction, wherein the middle land part includes a first sub groove and a second sub groove that are formed independently and arranged alternately in the tire circumferential direction on two sides of the middle land part in the tire width direction, the first sub groove being formed only by the lug groove and having one end thereof opening to one of the circumferential main grooves and the other end terminating in the middle land part, the second sub groove being formed by the lug groove and the sipe, the sipe being connected to the lug groove, the lug groove of the second sub groove having one end thereof opening to one of the circumferential main grooves and an other end of the lug groove terminating in the middle land part, the sipe of the second sub groove having one end thereof opening to the other end of the lug groove and an other end of the sipe terminating in the middle land part, and the middle land part further includes a wall on an outer side of the middle land part in the tire width direction defined into a first edge portion, a second edge portion, and a third edge portion by the first sub groove and the second sub groove which are adjacent in the tire circumferential direction, the second edge portion is circumferentially between the first sub groove and the second sub groove, and the second edge portion is offset in the tire width direction with respect to the first edge portion and the third edge portion.

2. The pneumatic tire according to claim 1, wherein in the middle land part, the sub grooves arranged on an inner side in the tire width direction and on the outer side in the tire width direction are arranged with respective termination positions shifted from each other in the tire circumferential direction.

3. The pneumatic tire according to any one of claim 2, wherein
in the center land part, third sub grooves that are each formed by the lug groove having one end thereof opening to one of the circumferential main grooves and the other end terminating in the center land part are arranged such that respective ends of the third sub grooves face each other on the inner side in the tire width direction and on the outer side in the tire width direction, and
fourth sub grooves that are each formed by the lug groove having one end thereof opening to one of the circumferential main grooves and the other end terminating in the center land part on each inner side in the tire width direction and on the outer side in the tire width direction and by the sipe connecting the terminations of the lug grooves are arranged alternately with the third sub grooves in tire circumferential direction.

4. The pneumatic tire according to claim 3, wherein the sub grooves in the middle land part and the sub grooves in the center land part are formed to be arranged facing each other in the tire width direction spaced by the circumferential main grooves, and to be inclined in an identical direction with respect to the tire circumferential direction.

5. The pneumatic tire according to claim 4, wherein
an auxiliary groove extending in the tire circumferential direction within a ground contact width is arranged in the shoulder land part.

6. The pneumatic tire according to claim 5, wherein
in the shoulder land part, a fifth sub groove and a sixth sub groove are alternately arranged in the tire circumferential direction, the fifth sub groove including the lug groove that is continuous with the auxiliary groove on an outer side of the auxiliary groove in the tire width direction, and the sixth sub groove including the lug groove that is not continuous with the auxiliary groove and terminates on the outer side of the auxiliary groove in the tire width direction.

7. The pneumatic tire according to claim 6, wherein
in the shoulder land part, the sipe extends from an end of the lug groove of each of sub grooves facing the auxiliary groove toward the inner side in the tire width direction, and opens to one of the circumferential main grooves.

8. The pneumatic tire according to claim 1, wherein
in the center land part, third sub grooves that are each formed by the lug groove having one end thereof opening to one of the circumferential main grooves and the other end terminating in the center land part are arranged such that respective ends of the third sub grooves face each other on the inner side in the tire width direction and on the outer side in the tire width direction, and
fourth sub grooves that are each formed by the lug groove having one end thereof opening to one of the circumferential main grooves and the other end terminating in the center land part on each inner side in the tire width direction and on the outer side in the tire width direction and by the sipe connecting the terminations of the lug grooves are arranged alternately with the third sub grooves in tire circumferential direction.

9. The pneumatic tire according to claim 8, wherein
the sub grooves in the middle land part and the sub grooves in the center land part are formed to be arranged facing each other in the tire width direction spaced by the circumferential main grooves, and to be inclined in an identical direction with respect to the tire circumferential direction.

10. The pneumatic tire according to claim 1, wherein
an auxiliary groove extending in the tire circumferential direction within a ground contact width is arranged in the shoulder land part.

11. The pneumatic tire according to claim 10, wherein
in the shoulder land part, a fifth sub groove and a sixth sub groove are alternately arranged in the tire circumferential direction, the fifth sub groove including the lug groove that is continuous with the auxiliary groove on an outer side of the auxiliary groove in the tire width direction, and the sixth sub groove including the lug groove that is not continuous with the auxiliary groove and terminates on the outer side of the auxiliary groove in the tire width direction.

12. The pneumatic tire according to claim 10, wherein
in the shoulder land part, the sipe extends from an end of the lug groove of each of sub grooves facing the auxiliary groove toward the inner side in the tire width direction, and opens to one of the circumferential main grooves.

* * * * *